(12) United States Patent
Rade et al.

(10) Patent No.: US 6,938,916 B2
(45) Date of Patent: Sep. 6, 2005

(54) VEHICLE WITH AN AIRBAG DEVICE CONNECTED TO INTERIOR FITTINGS

(75) Inventors: Rene Rade, Pinneberg (DE); Peter Tiefenthaler, Munich (DE); Manfred Veigl, Poing (DE); Karl-Heinz Sommer, Stockdorf (DE); Rudiger Lang, Ampfing (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/369,208

(22) Filed: Feb. 19, 2003

(65) Prior Publication Data

US 2004/0119272 A1 Jun. 24, 2004

Related U.S. Application Data

(63) Continuation of application No. PCT/EP01/09480, filed on Aug. 17, 2001, now abandoned.

(30) Foreign Application Priority Data

Aug. 19, 2000 (DE) .......................................... 100 40 681

(51) Int. Cl.$^7$ .............................................. B60R 21/20
(52) U.S. Cl. .................................... 280/728.3; 280/741
(58) Field of Search ............................ 280/728.3, 732, 280/728.2, 730.1, 736, 741

(56) References Cited

U.S. PATENT DOCUMENTS

| | | | | | |
|---|---|---|---|---|---|
| 5,447,326 A | * | 9/1995 | Laske et al. | ............. | 280/728.3 |
| 5,478,106 A | * | 12/1995 | Bauer et al. | ............. | 280/728.3 |
| 5,755,457 A | * | 5/1998 | Specht | .................... | 280/728.2 |
| 6,062,143 A | * | 5/2000 | Grace et al. | ................. | 102/530 |
| 6,070,902 A | * | 6/2000 | Kowalski et al. | ......... | 280/730.2 |
| 6,102,435 A | * | 8/2000 | Wallner et al. | .......... | 280/728.2 |
| 6,299,209 B1 | * | 10/2001 | Ankersson et al. | ...... | 280/728.3 |

FOREIGN PATENT DOCUMENTS

| | | |
|---|---|---|
| DE | 3932576 C2 | 3/1992 |
| DE | 4134995 C1 | 3/1993 |
| EP | 0408064 B1 | 11/1994 |

* cited by examiner

*Primary Examiner*—Peter C. English
(74) *Attorney, Agent, or Firm*—Madson & Metcalf

(57) ABSTRACT

The invention relates to a vehicle with an airbag device covered by part of an interior fitting, comprising an airbag disposed behind the interior fitting part and a gas generator which is pyrotechnically connected to the airbag. A cord-type gas generator (20) is used as a gas generator and is disposed inside the airbag (18). The cord-type gas generator (20) is placed lengthways within a U-shaped recess in the interior fitting which opens upon inflation of the airbag device.

14 Claims, 2 Drawing Sheets

VEHICLE WITH AN AIRBAG DEVICE CONNECTED TO INTERIOR FITTINGS

CROSS-REFERENCE TO RELATED APPLICATIONS

This is a continuation of International Application PCT/EP01/09480, with an international filing date of Aug. 17, 2001, published in German under PCT Article 21(2) and now abandoned.

BACKGROUND OF THE INVENTION

1. Field of the Invention

The invention relates to a motor vehicle with an airbag device covered by a part of the vehicle interior fitting, such as a trim panel. The airbag device includes an airbag disposed behind the interior fitting and a pyrotechnic gas generator connected to the airbag. The interior fitting includes an opening through which the airbag passes as it inflates. A cord-type gas generator is disposed inside the airbag and laid within a recess formed in part of the interior fitting corresponding to the opening of the interior fitting.

2. Description of Related Art

A motor vehicle with a correspondingly formed airbag device is described in EP 0 408 064 B1. The airbag device is disposed behind an auto interior trim panel, such as a dashboard, in a manner such that there is no visible indication of the opening through which the airbag is deployed. The airbag module includes a pyrotechnic gas generator disposed in a module housing and an airbag folded into the module housing connected to the gas generator. An encircling recess is disposed in the area of the dashboard engaging over the open side of the module housing, in such a manner that it partially encloses a flap of the dashboard. The flap lies in front of the open side of the module housing. An explosive cord is laid in the recess. The explosive cord, on its ignition, tears off of the dashboard along a line predefined by the encircling recess so that the dashboard flap can open and the airbag can inflate and unfold through the opening released by the flap.

The configuration described above has several disadvantages. Relatively great effort is required to produce the airbag module and the corresponding dashboard with the flap-like area which can be opened. On the one hand, the airbag module with the gas generator and the airbag must be manufactured and mounted in the motor vehicle. On the other hand, a suitable vehicle dashboard must be produced as a part of the interior fitting. The dashboard, the recess, which partially encloses the flap area, and the laid-in explosive cord must be carefully produced and mounted so that the dashboard and the airbag module are mutually aligned.

It is thus the objective of the invention to simplify the production and mounting of the airbag device in the associated motor vehicle.

The realization of this objective, including advantageous developments and extensions of the invention, follows from the contents of the claims which follow this description.

SUMMARY OF THE INVENTION

The invention provides a cord gas generator disposed in the interior of the airbag such that the cord gas generator is laid within a recess formed in part of the interior fitting corresponding to the opening of the interior fitting through which the airbag inflates. One advantage associated with the invention is that the cord gas generator not only provides gas necessary for inflating the airbag but also the pyrotechnic action of the cord gas generator opens the flap area provided in the part of the interior fitting. A suitable cord gas generator is known in its fundamental configuration from DE 39 32 576 C2.

The invention can preferably be used in forming or installing a dashboard as a part of the interior fitting. However, its use is not restricted to dashboard interior trim fittings. Rather the fundamental concept can also be applied to the mounting of side air bags behind the side trim located on a vehicle seat as well as for mounting airbags or airbag arrangements laid along the roof beam of a motor vehicle and, on triggering, unfolding in the manner of a curtain in front of the side area of a motor vehicle.

According to an embodiment example of the invention, the airbag fabric is fastened directly to the part of the interior fitting to fix the airbag. The use of a cord-type gas generator allows a separate module housing to be omitted and permits the airbag to be tied directly to the structure and the setup of the part of the interior fitting.

According to an embodiment example of the invention, the airbag is laid in an intermediate space formed between the part of the interior fitting and a supporting structural part. The airbag is disposed on the inner side of the interior fitting. It extends from the recess formed in the part of the interior fitting at one end thereof into the intermediate space. The cord-type gas generator is disposed within the airbag and positioned within the recess. The airbag with one end reaching into the recess of the part of the interior fitting may be integrated into the structure of the part of the interior fitting and fastened thereby. In alternative forms of embodiment of the invention the airbag fabric in the area of the recess can be incorporated into the foam in the structure of the part of the interior fitting or the airbag can be glued in the end thereof to the part of the interior fitting.

Alternatively or in addition, the airbag may be bonded to the part of the interior fitting by gluing the airbag fabric lying in the intermediate space to the inner side of the part of the interior fitting over a surface area.

According to an embodiment example of the invention, a constriction is provided adjacent the recess through which the two-layer fabric of the airbag is guided into the intermediate space. The constriction may be formed by the supporting structural part in combination with the part of the interior fitting. One advantage associated with the constriction is that, on ignition of the cord gas generator disposed within one end of the airbag in the recess, the gas pressure arising in the airbag is initially concentrated and tears off of the part of the interior fitting along the recess accommodating the cord gas generator before, with increasing amount of gas, the airbag inflates in a corresponding manner.

The same advantageous action of the constriction can be achieved by a constriction dividing the end of the airbag that accommodates the cord gas generator.

To support the tearing-off action when the cord gas generator ignites, the covering layer of the interior fitting may have a preferential break line along the recess accommodating the cord gas generator directed toward the interior space of the motor vehicle. The arrangement of such a preferential break line is known in principle from EP 0 408 064 B1.

The part of the interior fitting has at least one closed side which hinges at a hinge line, while other sides are opened upon ignition of the cord gas generator and inflation of the airbag. According to one embodiment example the hinge line is defined by a groove disposed on the inner side of the part of the interior fitting. The groove weakens the material and permits pivoting of the interior fitting material.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1–4, is not intended to limit the scope of the invention, as claimed, but is merely representative of presently preferred embodiments of the invention.

Figure 1:
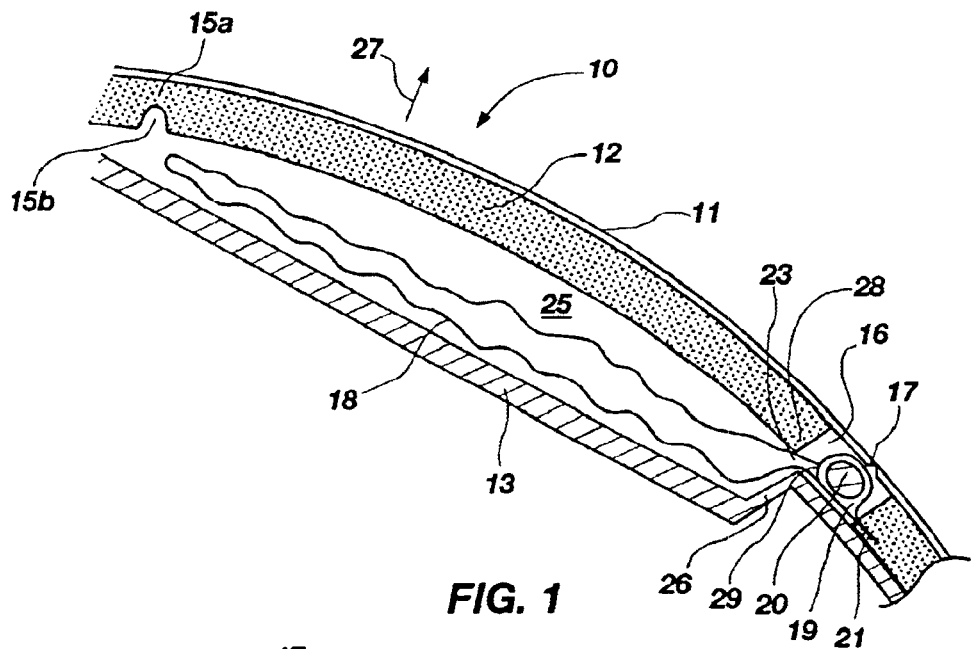
FIG. 1 is a cross-sectional view of a dashboard of a motor vehicle with an integrated airbag device.

FIG. 1 shows a cross-sectional view of a typical structure of a dashboard 10 used in a motor vehicle. The dashboard 10 has an outer skin 11 on its surface directed toward the interior of the motor vehicle and under which a foam layer 12 is disposed. The dashboard 10 is fastened and held on the supporting structural part 13 of the motor vehicle, where the supporting structural part 13 is formed in such a manner that an intermediate space 25 is formed between the supporting structural part 13 and the dashboard 10 via a step 26.

As follows from looking at FIGS. 1 and 2 together, a recess 16 is introduced in the foam layer 12 from the inner side of the dashboard 10, said recess being disposed in a U-shaped curve and thus partially enclosing the flap 14, which can be pivoted out in the direction of the arrow 27 around a hinge line 15a connecting the open U-legs. This hinge line 15a is defined and set in advance by a groove 15b introduced in the foam layer 12 on the inner side of the dashboard 10. The dashboard 10 is formed in the area of the recess 16 by the outer skin 11 covering the recess. A preferential break point 17 is introduced into the outer skin 11 from the inner side of the recess 16. The preferential break point predefines a tear-off line for the opening of the flap 14. The preferential break point 17 weakens the outer skin 11.

An airbag 18 is laid into the intermediate space 25 in a loose, unordered configuration. Alternatively, the airbag 18 may be laid in the intermediate space 25 in a folded, oriented configuration. An end 19 of the airbag 18 reaches into the recess 16 of the dashboard 10. A cord gas generator 20 is laid into the end 19 following the curve of the recess 16. A section 21 of fabric of the airbag 18 may be incorporated into the section of the foam layer 12 adjacent to the recess 16 so that a portion the airbag 18 is fastened directly to the dashboard 10.

The step 26 formed in the supporting structural part 13 is disposed in such a manner that the step 26 forms a constriction 23 with the edge 28 formed in the foam layer 12, adjacent the recess 16. The airbag 18, with its two layers of fabric, passes through the constriction 23 from the intermediate space 25 to the recess 16.

The same advantageous action of the constriction can be achieved by an optional constriction 29 dividing the end of the airbag that accommodates the cord gas generator, as shown in FIG. 1.

Figure 3:
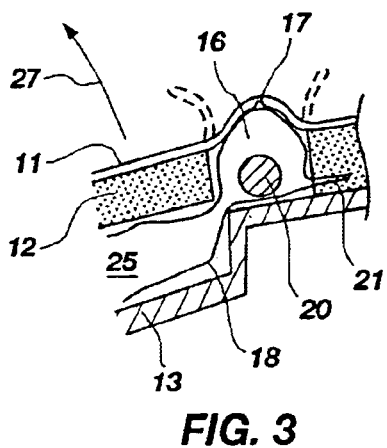
FIG. 3 is an enlarged cross-sectional view of the cord gas generator and the airbag disposed in the recess of the dashboard.

If, in a moment of sufficient danger the airbag device is triggered and the cord gas generator 20 ignites, then the cord gas generator 20 burns and generates high gas pressure initially in the end 19 within the recess 16 of the dashboard 10. The high pressure gas causes the outer skin 11 to tear off and separate along the preferential break point 17, as shown in FIG. 3. With increasing gas pressure the airbag 18 disposed in the intermediate space 25 inflates and presses on the inner side of the flap 14. This causes the flap 14 to pivot along the hinge line 15a defined in the foam layer 12 in the direction of the arrow 27 and enables the airbag 18 to be completely unfolded from the intermediate space 25.

Figure 2:
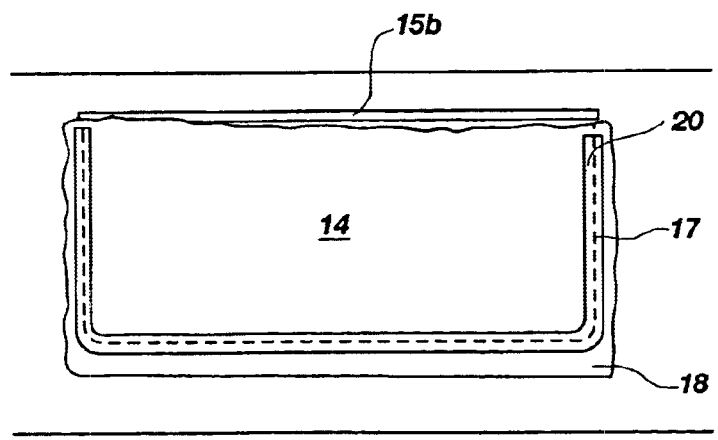
FIG. 2 is a view of the airbag device of the FIG. 1 in a view from the inner side of the dashboard.
Figure 4:
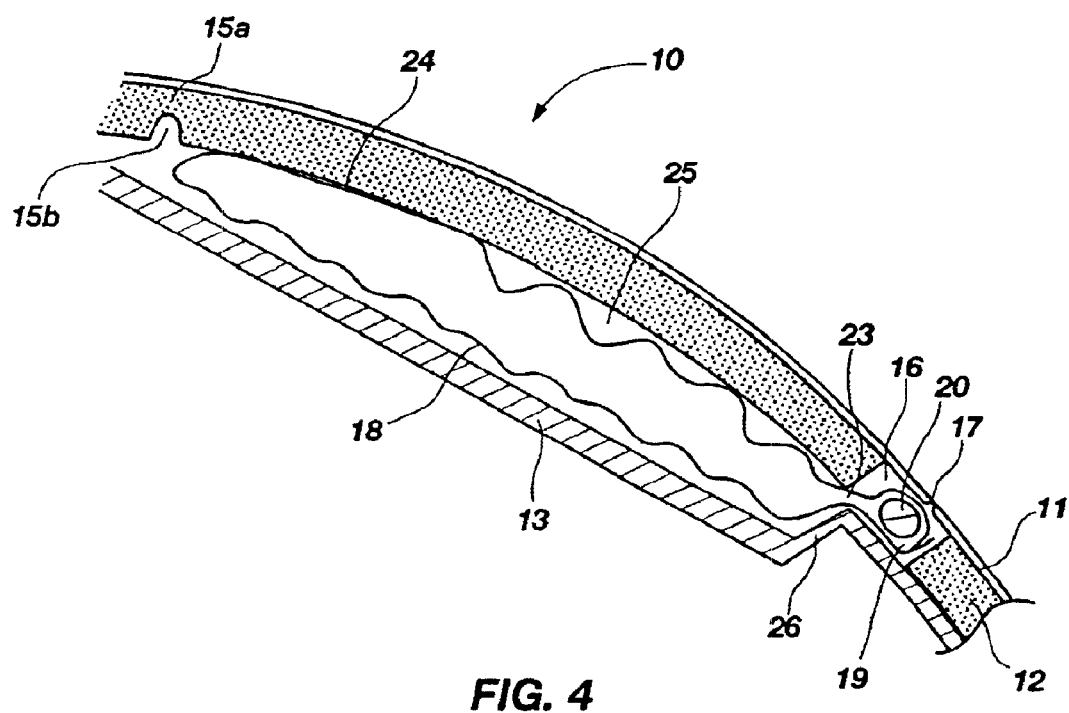
FIG. 4 is a cross-sectional view of a dashboard of a motor vehicle with an alternative embodiment of the integrated airbag device of the FIG. 1.

In the embodiment example of the invention represented in FIG. 4, the airbag 18 is not, as in the embodiment example according to FIGS. 1 to 3, connected to the dashboard 10 in the area of the end 19. Instead, a layer of airbag fabric is glued to an extended surface area 24 on the inner side of the foam layer 12 of the dashboard 10 to provide direct bonding of the airbag 18 to the dashboard 10. Its function however is the same as described in the embodiment examples according to FIGS. 1 to 3.

The characteristics of the invention disclosed in the preceding description, the patent claims, the abstract, and the drawings can be utilized individually or in any combination for the creation of the invention in its various embodiments. The present invention may be embodied in other specific forms without departing from its structures, methods, or other characteristics as described herein and claimed hereinafter. The described embodiments are to be considered only as illustrative, and not restrictive.

What is claimed is:

1. A motor vehicle comprising an airbag device covered by a part of an interior fitting designed to be opened upon inflation of the airbag device, wherein the interior fitting comprises a recess disposed in the part of the interior fitting designed to be opened and the airbag device comprises an airbag and a cord gas generator, and wherein the cord gas generator is disposed within an interior portion of the airbag and positioned within the recess.

2. The motor vehicle according to claim 1, wherein the airbag comprises airbag fabric, and wherein a portion of the airbag fabric is fastened directly to the part of the interior fitting to fix the airbag.

3. The motor vehicle according to claim 2, further comprising a supporting structural part which, in combination with the part of the interior fitting, defines an intermediate space, wherein the airbag is laid in the intermediate space and wherein an end of the airbag accommodates the cord gas generator and is disposed in the recess, wherein the interior fitting comprises an outer skin having a preferential break line extending along the recess, wherein the recess is U-shaped and defines a flap in the interior fitting which opens upon inflation of the airbag, and wherein the flap comprises a hinge line about which the flap pivots.

4. The motor vehicle according to claim 3, wherein the hinge line comprises a groove disposed on an inner side of the interior fitting which weakens the interior fitting.

5. The motor vehicle according to claim 1, further comprising a supporting structural part which, in combination with the part of the interior fitting, defines an intermediate space, wherein the airbag is laid in the intermediate space and wherein an end of the airbag accommodates the cord gas generator and is disposed in the recess.

6. The motor vehicle according to claim 5, wherein the end of the airbag disposed in the recess is integrated into a portion of the interior fitting adjacent to the recess and fastened thereby.

7. The motor vehicle according to claim 6, wherein the interior fitting comprises an outer skin under which a foam layer is disposed and wherein the airbag comprises airbag fabric and a portion of the airbag fabric near the end of the airbag is incorporated into the foam layer.

8. The motor vehicle according to claim 7, wherein the portion of the airbag fabric near the end of the airbag is glued to portion of the interior fitting.

9. The motor vehicle according to claim 5, wherein the part of the interior fitting has an inside surface and an outside surface, and wherein the airbag comprises airbag fabric and a portion of the airbag fabric lying in the intermediate space is glued to the inside surface.

10. The motor vehicle according to claim 5, wherein the part of the interior fitting combined with the supporting structural part form a constriction adjacent the recess and between the intermediate space and the recess, wherein airbag fabric passes through the constriction.

11. The motor vehicle according to claim 1, wherein an end of the airbag accommodates the cord gas generator and is disposed in the recess, wherein the airbag comprises a constriction dividing the end of the airbag to accommodate the cord gas generator.

12. The motor vehicle according to claim 1, wherein the interior fitting comprises an outer skin having a preferential break line extending along the recess.

13. The motor vehicle according to claim 1, wherein the recess which accommodates the cord gas generator is U-shaped and defines a flap in the part of the interior fitting which opens upon inflation of the airbag and wherein the flap comprises a hinge line about which the flap pivots.

14. The motor vehicle according to claim 13, wherein the hinge line comprises a groove disposed on an inner side of the interior fitting which weakens the interior fitting.

* * * * *